(No Model.)
G. E. WARING, Jr.
HYDRAULIC AIR COMPRESSING APPARATUS.
No. 562,052. Patented June 16, 1896.
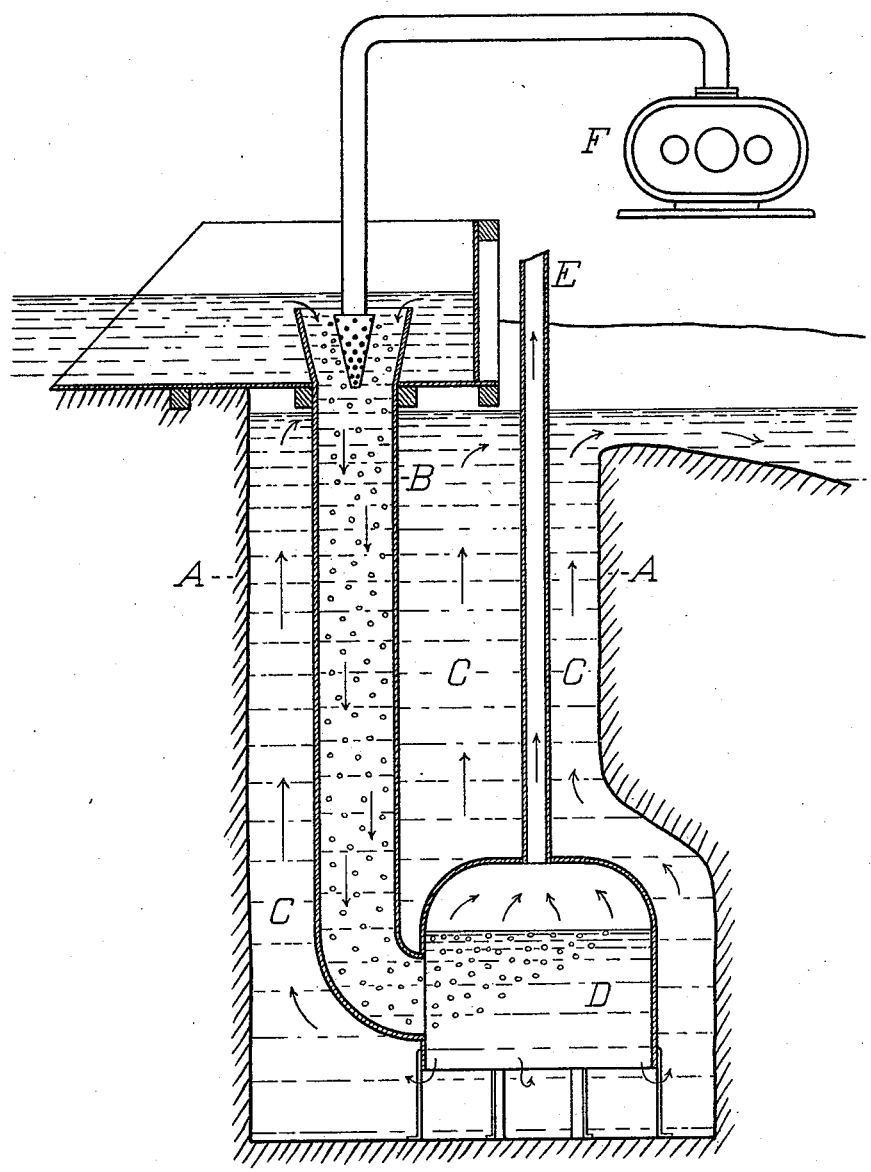
WITNESSES
INVENTOR

United States Patent Office.

GEORGE E. WARING, JR., OF NEW YORK, N. Y.

HYDRAULIC AIR-COMPRESSING APPARATUS.

SPECIFICATION forming part of Letters Patent No. 562,052, dated June 16, 1896.

Application filed September 30, 1895. Serial No. 564,076. (No model.)

*To all whom it may concern:*

Be it known that I, GEORGE E. WARING, Jr., a citizen of the United States, residing in the city and State of New York, have invented a new and useful Improvement in Hydraulic Air-Compressing Apparatus, of which the following is a specification.

This invention relates to apparatus in which a falling body of water is used to compress air by mechanically entangling it and carrying it down under constantly-increasing pressure to a point where separation occurs and the compressed air is collected for use. Such apparatus is described in United States Patents Nos. 543,410, 543,411, and 543,412, dated July 23, 1895.

My invention has for its object an increase of efficiency in such apparatus by the provision of means for the introduction into the falling column of water of a larger amount of air than could be introduced by means heretofore used for the purpose.

The invention consists in the proper application of air pumps, blowers, or compressors, or other suitable device for driving air into the falling mass of water and thus increasing the amount of air to be compressed thereby.

The method of applying my invention is clearly shown in the drawing, in which A is a well sunk in the earth, near a flowing stream or body of water, of a depth varying with the amount of air compression to be obtained.

B is a vertical tube or conductor fixed within the well and reaching from its top to within a short distance of its bottom. Water is delivered into the top of this conductor and falls through it, rising and escaping through the the space C. If air is introduced into the descending column of water, it is carried down with it and compressed.

D is a chamber, open at the bottom, into which the descending water with its contained air is delivered, so placed and arranged as to collect the globules of compressed air as they are separated from the water.

E is a pipe leading the compressed air from the chamber D to a suitable storage-reservoir. The apparatus thus far described is not original with me, but it is here outlined as necessary to a full understanding of my invention.

F is an air pump or compressor which I use to introduce air into the descending body of water in the tube B.

I am aware that various devices have been used for the same purpose, but in all of these devices the air is drawn in by induction, and the quantity which can be introduced in this way is much less than the amount which can with economy be compressed by the descending mass of water. I do not propose to abandon the introduction of air by induction, but to supplement it, so far as may be found desirable, by the injection of air under more than atmospheric pressure. As this injected air needs only to be delivered at a point just below the surface of the water a large volume can be introduced with but little expenditure of power.

What I claim, and desire to secure by Letters Patent, is—

In combination with apparatus for compressing air by the action of a descending mass of water, means for injecting air into said mass, substantially as set forth.

GEO. E. WARING, JR.

Witnesses:
GEO. WAY SWINBURNE, Jr.,
G. EVERETT HILL.